United States Patent [19]

Cuscurida et al.

[11] Patent Number: 4,518,720

[45] Date of Patent: May 21, 1985

[54] FLEXIBLE POLYURETHANE FOAMS MADE FROM POLYETHER POLYOLS MODIFIED WITH EPOXY RESIN-DIAMINE ADDUCTS

[75] Inventors: Michael Cuscurida; Harold G. Waddill; Bruce W. Peterson, all of Austin, Tex.

[73] Assignee: Texaco Inc., White Plains, N.Y.

[21] Appl. No.: 619,434

[22] Filed: Jun. 11, 1984

[51] Int. Cl.³ .............................................. C08G 18/14
[52] U.S. Cl. .................................... 521/156; 521/167; 521/174; 521/175; 521/176; 521/177
[58] Field of Search ............... 521/156, 167, 174, 175, 521/176, 177

[56] References Cited

U.S. PATENT DOCUMENTS 4,373,034  2/1983  Speranza et al. ................... 521/177

*Primary Examiner*—Maurice J. Welsh
*Attorney, Agent, or Firm*—Jack H. Park; Kenneth R. Priem; David L. Mossman

[57] ABSTRACT

Flexible polyurethane foams having improved properties and made from modified polyether polyols are described. The polyether polyols are modified with adducts of epoxy resins, such as the diglycidyl ether of Bisphenol A, and diamines, such a polyoxypropylenediamine. The resulting modified polyether polyols have a molecular weight of from about 2,000 to 7,000. The mole ratio of epoxy equivalents to amine equivalents in the adduct ranges from about 2/1 to 10/1.

13 Claims, No Drawings

FLEXIBLE POLYURETHANE FOAMS MADE FROM POLYETHER POLYOLS MODIFIED WITH EPOXY RESIN-DIAMINE ADDUCTS

CROSS-REFERENCE TO RELATED APPLICATION

This application is related to U.S. patent application Ser. No. 619,435, which is concerned with the production of polyether polyols modified with epoxy resin-diamine adducts.

BACKGROUND OF THE INVENTION

1. Field of the Invention

The invention relates to flexible polyurethane foams made from modified polyether polyols and more particularly relates to foams made from polyether polyols modified with epoxy resin-diamine adducts.

2. Description of the Prior Art

Presently, polyether polyols suitable for use in flexible foams are made by the reaction of glycerine with mixtures of alkylene oxides. Persons skilled in the art of making polyols can add alkylene oxides to polyhydric initiators such as glycerine or to an intermediate molecular weight alkylene oxide adduct of the initiator to prepare products in the 20–60 hydroxyl number range. While generally satisfactory, foams prepared from these prior art polyols are not firm enough for many cushioning applications particularly at lower foam densities. Conventional means of producing firmer (higher ILD) foams such as higher functionality initiators, short chain crosslinkers or fillers lead to other deficiencies in foam properties such as closed cells, poor tear and elongation properties and increased foam density. It is, therefore, an object of this invention to increase the functionality of triols by their reaction with epoxy resins-diamine adducts to prepare a new type of polyether polyol which would produce useful flexible foams. The polyols of this invention would also be expected to find application in semiflexible foams and reaction injection molded elastomers.

Other patents disclose reactions involving polyols and epoxy resins. Japanese Patent No. 71-24,255 concerns the reaction of a glycerine-based 3,000 molecular weight triol with 2% bisphenol A epoxy resin to produce foams with increased hardness. A close examination of this patent will show that the epoxy resin is added at only the end of the triol chain.

U.S. Pat. No. 3,012,984 describes how hydroxyl terminated polyesters, epoxy resins and isocyanate terminated prepolymers may be reacted in an inert organic solvent to produce metal primers and coatings. U.S. Pat. No. 3,010,940 discloses how phenol, epoxy resins, polyisocyanates and alphamethylbenzyldimethylamine react to produce various polyurethane coatings. U.S. Pat. No. 3,448,046 describes how polyols containing chlorine are mixed with epoxy resins before reaction with an isocyanate. The free epoxides scavenge the HCl in the polyol and do not contribute to the functionality of the polyol. The reaction of an epoxide with an alcoholic hydroxyl group is set out in U.S. Pat. No. 3,317,609. Further, British Pat. No. 968,102 describes how polyols suitable for polyurethane foams may be prepared from the reaction of a polyol, and an epoxy resin in the presence of an acidic catalyst.

Further prior art polyols include those described in German Offenlegungschrifft No. 2,056,080. This patent describes how epoxy adhesives may be made by the reaction of epoxy resins with 4-mercaptobutanol-blocked urethane prepolymers which are made from toluene diisocyanate and various polyols. German Offenlegungschrifft No. 1,905,696 discloses how polyurethane lattices may be produced by chain-extending a urethane prepolymer by using the reaction product of polyethylene glycols of a molecular weight of about 5,000 to 10,000, and an aromatic diglycidyl ether. The modification of epoxy resins by heating them with added polyalkoxylated disaccharides is described in Belgium Patent No. 785,020.

It is known to modify polyether polyols with epoxy resins alone. For example, U.S. Pat. No. 4,316,991 to Texaco Inc. teaches that polyols modified with epoxy resins of 2,000 to 7,000 molecular weight produce flexible polyurethane foams with higher load bearing properties than unmodified polyols. U.S. Pat. No. 4,309,532, also to Texaco Inc., reveals the modification of rigid amino polyols by their reaction with epoxy resins and alkylene oxides. Polyurethane foams made using these modified polyols are encompassed by U.S. Pat. Nos. 4,373,034 and 4,394,463, respectively.

Other patents disclosing polyethers and polyether polyols from alkylene oxides and compounds having more than one epoxy group include U.S. Pat. Nos. 2,792,354; 3,544,655; 4,113,785 and 4,230,827.

SUMMARY OF THE INVENTION

The invention concerns flexible polyurethane foam made by reacting a modified polyether polyol together with an organic polyisocyanate in the presence of a polyurethane catalyst and a blowing agent. The modified polyether polyol is produced by adding an epoxy resin-diamine adduct to a polyether polyol during the reaction of an alkylene oxide with a polyol initiator.

DESCRIPTION OF THE PREFERRED EMBODIMENTS

The modified polyether polyols used in the flexible polyurethane foams of the invention may be made by adding an epoxy resin-diamine adduct to a polyether polyol any time during the reaction of one or more alkylene oxides with a polyol initiator. Thus, the epoxy resin-diamine adduct may be placed in the middle, near the ends or at the ends of the resultant polyether polyol molecules. Preferably, the epoxy resin-diamine adduct is situated in the middle of the final polyol molecule. It should be noted that, like most polymer products, the final modified polyether polyol is actually a distribution of highly similar, slightly different molecules.

The epoxy resin-diamine adducts suitable for the method of this invention may be made simply by heating suitable epoxy resins and diamines together at a temperature in the range of about 25° to 100° C.

it is anticipated that a wide variety of epoxy resins would be useful in practicing this invention. The vicinal polyepoxide containing compositions are organic materials having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups; e.g., hydroxyl groups, ether radicals, aromatic halogen atoms and the like.

Preferred polyepoxides are those of glycidyl ethers prepared by epoxidizing the corresponding allyl ethers or reacting, by known procedures, a molar excess of epichlorohydrin and an aromatic polyhydroxy compound; i.e., isopropylidene bisphenol, novolak, resorcinol, etc. The epoxy derivatives of methylene or isopropylidene bisphenols are especially preferred. The diglycidyl ether of Bisphenol A is used in the examples herein. Some of these epoxy resins are known in the trade as EPON ® resins and may be obtained from Shell Chemical Co.

A widely used class of polyepoxides which are useful according to the instant invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4'-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones; e.g., methylhydroquinone, and the like.

Another class of polymeric polyepoxides which can be amine cured and are in accordance with the instant invention includes the epoxy novolak resins obtained by reacting, preferably in the presence of a basic catalyst; e.g., sodium or potassium hydroxide, an epihalohydrin, such as epichlorohydrin, with the resinous condensate of an aldehyde; e.g., formaldehyde, and either a monohydric phenol; e.g., phenol itself, or a polyhydric phenol. Further details concerning the nature and preparation of these epoxy novolak resins can be obtained in Lee, H. and Neville, K., *Handbook of Epoxy Resins,* McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole. Particularly preferred are aliphatic epoxides, the diglycidyl ether of Bisphenol A and epoxy novolak resins.

The diamines useful in the method of this invention include alkylenediamines containing 2 to 6 carbon atoms such as ethylenediamine, 1,2-diaminopropane, 1,3-diaminobutane, 1,5-diaminopentane, 1,6-diaminohexane and the like, aromatic diamines such as m-, o- and p-phenylenediamine, and polyoxyalkylenediamines in the 200 to 2,000 molecular weight range. Polyoxyalkylenediamines are particularly preferred in the method of this invention, in particularly the JEFFAMINE ® polyoxypropylenediamines sold by Texaco Chemical Company. It is contemplated that other alkoxylated amines would be useful in the method of this invention such as polyoxyethylenediamines and polyoxybutylenediamines.

When making the epoxy resin-diamine adduct it is preferred that the mole equivalents of epoxy in the polyepoxide to mole equivalents of amine in the diamine be in the range of about 2/1 to 10/1.

It is well known that polyethers for polyurethane applications can be prepared by the base catalyzed reaction of propylene oxide with an initiator having a low hydrogen functionality; that is, containing from three to four reactive hydrogen atoms. Such initiators include, for example, glycerine, trimethylolpropane, 1,2,6-hexanetriol, pentaerythritol, triethanolamine, ethylenedimaine and aminoethylpiperazine. Other initiators include such compounds as ethylene glycol, propylene glycols, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers; e.g., polyethylene glycols, polypropylene glycols, triglycerol, dipentaerythritol and the like, polyallyl alcohol, polyhydric thioethers, such as 2,2'-,3,3'-tetrahydroxydipropylsulfide and the like, mercapto alcohols such as monothioglycerol, dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like. If base catalysis is used, the alkaline catalysts normally employed are sodium hydroxide and potassium hydroxide. Other techniques to prepare polyols are known to those skilled in the art.

Polyether polyols having equivalent weights of up to about 750 are normally prepared in a one-step process by the reaction of propylene oxide with such an initiator. For the preparation of larger molecules, a two-step process is usually employed. In the first step, a product having an equivalent weight of from about 150 to about 750 is prepared, and in the second step this is reacted further with propylene oxide to prepare the higher molecular weight product.

The epoxy resin-diamine adduct may be added at any stage of the polyether polyol formation. In other words, the epoxy resin-diamine adduct may be added to the initiator before the addition of any alkylene oxide, during the addition of an alkylene oxide or after the addition of all the alkylene oxide as a cap. It is preferred that the epoxy resin-diamine adduct is added into the middle of the polyether polyol; that is, after some alkylene oxide has been reacted with the initiator but before the alkylene oxide addition is complete.

The alkylene oxides useful in this invention are ethylene oxide, propylene oxide and 1,2-butylene oxide. Ethylene oxide and propylene oxide are preferred for this invention, and these reactants are used in the examples herein. More than one alkylene oxide may be added to the reaction mixture as deemed necessary by one skilled in the art practicing this invention. In fact, it is preferred that a mixture of ethylene oxide and propylene oxide be used.

The reaction conditions of temperature and pressure to make the polyether polyol may be selected by the invention practitioner to meet certain specifications required by the polyol for a particular use. The examples herein use a pressure of about atmospheric to 100 psig and a temperature of about 50° to 150° C. as preferred for making modified polyether polyols that would be useful in flexible foams.

The amount of epoxy resin-diamine adduct should be such that the final modified polyether polyol contains from about 0.5 to 5.0 wt.% of the adduct. The final molecular weight of the modified polyether polyols should be on the order of 2,000 to 7,000, and they should have a hydroxyl number of from about 20 to 60.

The flexible polyurethane foams of this invention will be further illustrated by the following examples which will demonstrate the preparation of the epoxy resin-diamine adduct, its incorporation into a polyether polyol and then the modified polyol's use in a polyurethane foam. It is well known to use polyols to react with organic polyisocyanates in the presence of a polyurethane catalyst such as a tin or tertiary amine compound and a blowing agent, such as carbon dioxide or water, together with various additives. See, for example, U.S. Pat. Nos. 4,338,408; 4,342,687 and 4,381,353, incorporated by reference herein.

It has been discovered that the modified polyether polyols are useful in the preparation of flexible polyurethane foams of this invention which have improved properties over foams made from prior art polyols. Flexible foams made from 3,500 molecular weight (average) polyols of this invention have equivalent firmness and better elongation properties than foams made from a 3,000 molecular weight unmodified polyol. Since the 3,500 molecular weight polyols have a lower polyisocyanate requirement than the 3,000 molecular weight material, these advantages are realized with a net saving of isocyanate.

Further, higher levels of the epoxy resin-diamine adduct can be incorporated into the polyols as compared to the epoxy resin alone. In addition, there is less chance of gelation using the epoxy resin-diamine adducts of this invention as compared to the use of the epoxy resin alone which results in the formation of lower viscosity polyol products.

EXAMPLE 1

This example will illustrate the preparation of the epoxy resin-diamine adduct of this invention. Into a 2-liter three-necked flask equipped with a stirrer, thermometer, condenser, and nitrogen source was charged 1283 g of diglycidyl ether of Bisphenol A (DGEBPA). The DGEBPA was heated to 65° C. and 64.15 g of a 230 molecular weight polyoxypropylenediamine (JEFFAMINE ®D-230 made by Texaco Chemical Co.) was slowly added. The reaction mixture was then heated at 70°-80° C. for 1.0 to 2.0 hours. The product was a highly viscous yellow liquid.

EXAMPLE 2

Into a ten-gallon kettle was charged 5.0 lbs of a 600 molecular weight propylene oxide (PO)/ethylene oxide (EO) adduct of glycerine (alkalinity, mg KOH/g 25.35). The reactor was then purged with prepurified nitrogen. A mixture of 9.5 lbs of PO and 0.35 lbs of EO was then reacted at 104°-110° C. at 50 psig. Approximately 1.3 hours were required for addition of the mixed oxides. The reaction mixture was then digested to an equilibrium pressure. The DGEBPA-diamine adduct of Example 1 (0.5 lb) mixture was then reacted at 105°-110° C. An additional 9.5 lb of PO and 0.35 lb of EO was then reacted at 105°-110° C. over a 1.3 hour period. The reaction was then terminated by reaction with 0.4 lbs of PO. After digestion to an equilibrium pressure, the alkaline product was neutralized by stirring with 345 g of magnesium silicate. Di-t-butyl-p-cresol (46.4 g) and octylated diphenylamine (7.0 g) were also added at this point. The neutralized product was then vacuum stripped to a minimum pressure, nitrogen-stripped one-half hour and filtered. The finished product had the following properties.

| | |
|---|---|
| Acid number, mg KOH/g | 0.008 |
| Hydroxyl number, mg KOH/g | 54.5 |
| Water, wt. % | 0.01 |
| Unsaturation, meg/g | 0.035 |
| pH in 10:6 isopropanol/water | 7.5 |
| Color, Pt—Co | 25 |
| Sodium, ppm | 0.2 |
| Potassium, ppm | 0.2 |
| Peroxides, ppm | 0.5 |
| Viscosity, °F., cs | |
| 77 | 767 |
| 100 | 368 |

EXAMPLES 3-5

This example will further illustrate this invention using various levels of the DGEBPA-diamine adduct of Example 1. These polyols were prepared using the general procedure of Example 2. Reaction charges, details of preparation, and properties are shown in the following table.

| | 3 | 4 | 5 |
|---|---|---|---|
| Charge | | | |
| 600 m.w. PO/EO adduct of glycerine, lb[1] | 10.0 | 5.0 | 5.0 |
| PO, lb ⎫ mixed | 17.4 | 9.15 | 9.5 |
| EO, lb ⎭ step 1 | 2.6 | 0.35 | 0.35 |
| DGEBPA-diamine adduct of Ex. 1, lb | 0.5 | 0.9 | 1.8 |
| PO, lb ⎫ mixed | 25.0 | 9.15 | 9.5 |
| EO, lb ⎭ step 2 | 3.6 | 0.35 | 0.35 |
| PO, lb | 1.8 | 0.7 | 0.4 |
| Magnesium silicate, g | 700 | 350 | 350 |
| Di-t-butyl p-cresol, g | 110.7 | 464 | 46.8 |
| Octylated diphenylamine, g | 16.6 | 7.0 | 7.3 |
| Reaction details | | | |
| DGEBPA-diamine content, wt. % | 0.82 | 3.5 | 6.69 |
| Temperature, °C. | 105–110 | 105–110 | 105–110 |
| Pressure, psig | 50 | 50 | 50 |
| Oxide addition time, hr | 5.7 | 4.5 | 4.5 |
| Properties | | | |
| Acid number, mg KOH/g | 0.008 | 0.006 | — |
| Hydroxyl no., mg KOH/g | 46.7 | 54.3 | 52.0 |
| Water, wt. % | 0.04 | 0.04 | — |
| Unsaturation, meg/g | 0.021 | 0.032 | — |
| pH in 10:6 isopropanol/water | 8.0 | 7.5 | — |
| Color, Pt—Co | 25 | 30–40 | — |

-continued

| | 3 | 4 | 5 |
|---|---|---|---|
| Sodium, ppm | 0.2 | 0.2 | — |
| Potassium, ppm | 0.2 | 0.2 | — |
| Peroxide, ppm | 1.3 | 0.74 | — |
| Viscosity, °F. cs | | | |
| 77 | 669 | 1142 | 17864 |
| 100 | 348 | 555 | 2156 |

[1]Alkalinity, mg KOH/g = 25.75

EXAMPLES 6–13

These examples will demonstrate that higher levels of the DGEBPA-diamine adduct of Example 1 can be incorporated into polyols than DGEBPA alone to prepare lower viscosity products. This serves to reduce the chance of gelation during the reaction.

In these experiments, various levels of the DGEBPA diamine adduct were reacted with an 1815 molecular weight PO/EO adduct of glycerine which had an alkalinity of 8.26 mg KOH/g. This corresponds to the midpoint of PO/EO addition (step 1) as described in Example 2. Viscosities of the resultant products are shown in the following table.

| Example No. | 6 | 7 | 8 | 9 | 10 | 11 | 12 | 13 |
|---|---|---|---|---|---|---|---|---|
| DGEBPA-diamine adduct of Ex. 1, wt. % | — | — | — | — | 3.85 | 5.66 | 7.4 | 9.1 |
| DGEBPA, wt. % | 3.85 | 5.66 | 7.4 | 9.1 | — | — | — | — |
| Viscosity, 77° F., cps | 2278 | 4177 | 17846 | Gelled | 1626 | 2612 | 5090 | 22264 |

EXAMPLES 14–17

These examples will illustrate the use of 3500 molecular weight polyol of this invention (Example 3) in the preparation of flexible foam. It will further show that foams made from this polyol have the same firmness and improved elongation as compared to those made from a 3000 molecular weight prior art polyol (THANOL ®F-3016 made by Texaco Chemical Co.). This is accomplished using less toluene diisocyanate. All foams were processed on a Martin Sweets foam machine. Formulations and foam properties are shown below.

| Example No. | 14 | 15 | 16 | 17 |
|---|---|---|---|---|
| Formulation, pbw | | | | |
| Polyol of Ex. 3[1] | 100 | 100 | — | — |
| 3000 m.w. PO/EO adduct of glycerine[2] | — | — | 100 | 100 |
| Water | 4.0 | 4.0 | 4.0 | 4.0 |
| DC-5125 silicone[3] | 0.9 | 0.9 | 0.9 | 0.9 |
| 33% triethylenediamine in propylene glycol[4] | 0.1 | 0.1 | 0.1 | 0.1 |
| Dimethylaminoethanol[5] | 0.27 | 0.27 | 0.27 | 0.27 |
| 50% stannous octoate in dioctyl phthalate[6] | 0.27 | 0.31 | 0.37 | 0.47 |
| Toluene diisocyanate | 50.54 | 50.54 | 52.1 | 52.1 |
| Isocyanate index | 1.1 | 1.1 | 1.1 | 1.1 |
| Properties | | | | |
| Density, pcf | 1.59 | 1.58 | 1.54 | 1.50 |
| IFD (lb/50 in²) | | | | |
| 25% | 50.0 | 51.0 | 48 | 49 |
| 65% | 97.0 | 98.0 | 91 | 95.5 |
| 25R | 31.5 | 31.0 | 30.0 | 31.0 |
| Tensile, psi | 17.6 | 18.3 | 17.4 | 18.2 |
| Tear, pli | 2.3 | 2.4 | 2.7 | 2.0 |
| Elongation, % | 135 | 138 | 125 | 127 |
| Compression set, | | | | |
| 50% | 5.2 | 5.5 | 4.2 | 5.3 |
| 90% | 6.9 | 7.0 | 4.3 | 6.4 |

-continued

| Example No. | 14 | 15 | 16 | 17 |
|---|---|---|---|---|
| Ball rebound, % | 40 | 38 | 39 | 38 |
| Breathability, cfm | 2.1 | 2.0 | 3.3 | 2.1 |

[1]Hydroxyl no., mg KOH/g = 46.7
[2]THANOL ® F-3016 made by Texaco Chemical Co.
[3]Silicon surfactant made by Dow-Corning Corp.
[4]THANCAT ® TD-33 made by Texaco Chemical Co.
[5]THANCAT DME made by Texaco Chemical Co.
[6]T-10 catalyst made by M & T Chemicals Many modifications may be made by one skilled in the art in the flexible polyurethane foams of this invention without departing from the spirit and the scope thereof which are defined only in the appended claims.

For example, it may be found that particular proportions of a certain epoxy resin and a certain diamine reacted under special conditions and incorporated a certain way into a polyether polyol may prove particularly advantageous upon reaction with an organic polyisocyanate to produce a polyurethane.

We claim:

1. Flexible polyurethane foam being produced by the process comprising
   reacting a modified polyether polyol together with an organic polyisocyanate in the presence of a polyurethane catalyst and a blowing agent, wherein the modified polyether polyol is produced by the process comprising adding an epoxy resin-diamine adduct to a polyether polyol during the reaction of an alkylene oxide with a polyol initiator where the mole ratio of epoxy equivalents to amine equivalents in the epoxy resin-diamine adduct is in the range of about 2/1 to about 10/1.

2. The flexible polyurethane foam of claim 1 in which from about 0.5 to 5.0 wt.% of the total polyether polyol is the epoxy resin-diamine adduct.

3. The flexible polyurethane foam of claim 1 in which the modified polyether polyol has a molecular weight in the range of about 2,000 to 7,000 and a hydroxyl number in the range of about 20 to 60.

4. The flexible polyurethane foam of claim 1 in which the alkylene oxide used to make the modified polyether polyol is selected from the group consisting of ethylene oxide, propylene oxide, butylene oxide and mixtures thereof.

5. The flexible polyurethane foam of claim 1 in which the epoxy resin-diamine adduct is made by reacting a diamine from the group consisting of polyoxyalkylenediamines having a molecular weight in the range of about 200 to 2,000, alkylene diamines having 2 to 6 carbon atoms and aromatic diamines, with a polyepoxide from the group consisting of aromatic, aliphatic and cyclo aliphatic polyepoxides having an average of at least 1.8 reactive epoxy groups per molecule.

6. The flexible polyurethane foam of claim 5 in which the epoxy resin is selected from the group of epoxy resins consisting of aliphatic epoxides, the diglycidyl ether of Bisphenol A and epoxy novolak resins.

7. A method for producing a flexible polyurethane foam comprising
   a. reacting an epoxy resin with a diamine such that the mole ratio of epoxy equivalents to amine equivalents is in the range of about 2/1 to about 10/1, to form an epoxy resin-diamine adduct,
   b. reacting the epoxy resin-diamine adduct from step a. with a reaction mixture of a polyol initiator with an alkylene oxide to form a modified polyether polyol, and
   c. reacting the modified polyether polyol from step b. with an organic polyisocyanate in the presence of a polyurethane catalyst and a blowing agent.

8. The method of claim 7 in which the modified polyether polyol of step b. is subsequently capped with an alkylene oxide before it is further reacted with the organic polyisocyanate.

9. The method of claim 7 in which the modified polyether polyol contains from about 0.5 to 5.0 wt.% epoxy resin-diamine adduct based on the total modified polyether polyol.

10. The method of claim 7 in which the modified polyether polyol has a molecular weight in the range of about 2,000 to 7,000 and a hydroxyl number of about 20 to 60.

11. The method of claim 7 in which the alkylene oxide used to make the modified polyether polyol is selected from the group consisting of ethylene oxide, propylene oxide, butylene oxide and mixtures thereof.

12. The method of claim 7 in which the epoxy resin-diamine adduct is made by reacting a diamine from the group consisting of polyoxyalkylenediamines having a molecular weight in the range of about 200 to 2,000, alkylene diamines having 2 to 6 carbon atoms and aromatic diamines, with a polyepoxide from the group consisting of aromatic, aliphatic and cycloaliphatic polyepoxides having an average of at least 1.8 reactive epoxy groups per molecule.

13. The method of claim 12 in which the epoxy resin is selected from the group of epoxy resins consisting of aliphatic epoxides, the diglycidyl ether of Bisphenol A and epoxy novolak resins.

* * * * *